United States Patent
Sunderlin

(10) Patent No.: US 8,847,554 B2
(45) Date of Patent: Sep. 30, 2014

(54) SYSTEM FOR PREVENTING DEEP BATTERY DISCHARGE

(75) Inventor: Tim A. Sunderlin, Henderson, NV (US)

(73) Assignee: K2 Energy Solutions, Inc., Henderson, NV (US)

( * ) Notice: Subject to any disclaimer, the term of this patent is extended or adjusted under 35 U.S.C. 154(b) by 468 days.

(21) Appl. No.: 12/813,269

(22) Filed: Jun. 10, 2010

(65) Prior Publication Data

US 2010/0315044 A1  Dec. 16, 2010

Related U.S. Application Data

(60) Provisional application No. 61/185,809, filed on Jun. 10, 2009.

(51) Int. Cl.
| | | |
|---|---|---|
| *H02J 7/00* | (2006.01) | |
| *H01M 10/48* | (2006.01) | |
| *H01M 10/42* | (2006.01) | |
| *H01M 10/0525* | (2010.01) | |

(52) U.S. Cl.
CPC ........ *H01M 10/482* (2013.01); *H01M 10/0525* (2013.01); *H01M 10/425* (2013.01)
USPC .............................. 320/136; 320/132; 320/163

(58) Field of Classification Search
CPC .. H02J 7/0026; H02J 7/0031; H02J 2007/004
USPC ......... 320/136, 125, 126, 134, 162, 165, 143, 320/103, 116, 117, 132, 149, 163; 324/426, 324/427, 430, 433
See application file for complete search history.

(56) References Cited

U.S. PATENT DOCUMENTS

| | | | |
|---|---|---|---|
| 3,526,787 A | | 9/1970 | Stover |
| 4,052,003 A | | 10/1977 | Steffen |
| 5,304,915 A | | 4/1994 | Sanpei et al. |
| 5,898,293 A | * | 4/1999 | Tamai et al. ................ 320/136 |
| 6,888,468 B2 | * | 5/2005 | Bertness ................ 340/636.15 |
| 2005/0134230 A1 | | 6/2005 | Sato et al. |

FOREIGN PATENT DOCUMENTS

| | | | |
|---|---|---|---|
| DE | 23 40 878 | | 2/1975 |
| EP | 0512340 A1 | | 11/1992 |
| EP | 1533882 A2 | * | 5/2005 |
| EP | 1533882 A2 | | 5/2005 |
| GB | 1271497 A | | 4/1972 |
| JP | 04033271 A | * | 2/1992 |

OTHER PUBLICATIONS

International Search Report or PCT/US2010/038153 dated Jun. 10, 2010.
Written Opinion of the International Searching Authority for PCT/US2010/038153 dated Jun. 10, 2010.
European Examination Report, dated Jun. 12, 2013.

* cited by examiner

*Primary Examiner* — Edward Tso
*Assistant Examiner* — Aaron Piggush
(74) *Attorney, Agent, or Firm* — Stine Law Ltd.

(57) ABSTRACT

A battery management system for managing the voltage of a battery cell, such as a lithium ion battery, is disclosed. The battery management system comprises a semiconductor switch coupled to the battery cell, wherein the semiconductor switch is in an on condition when the voltage across the battery cell exceeds a first threshold voltage, and a microprocessor coupled to the semiconductor switch, wherein the microprocessor monitors the voltage across the battery cell when the semiconductor switch is on, and turns itself off when the when the monitored voltage is less than a second threshold voltage, thereby preventing further current drain from the battery cell.

6 Claims, 1 Drawing Sheet

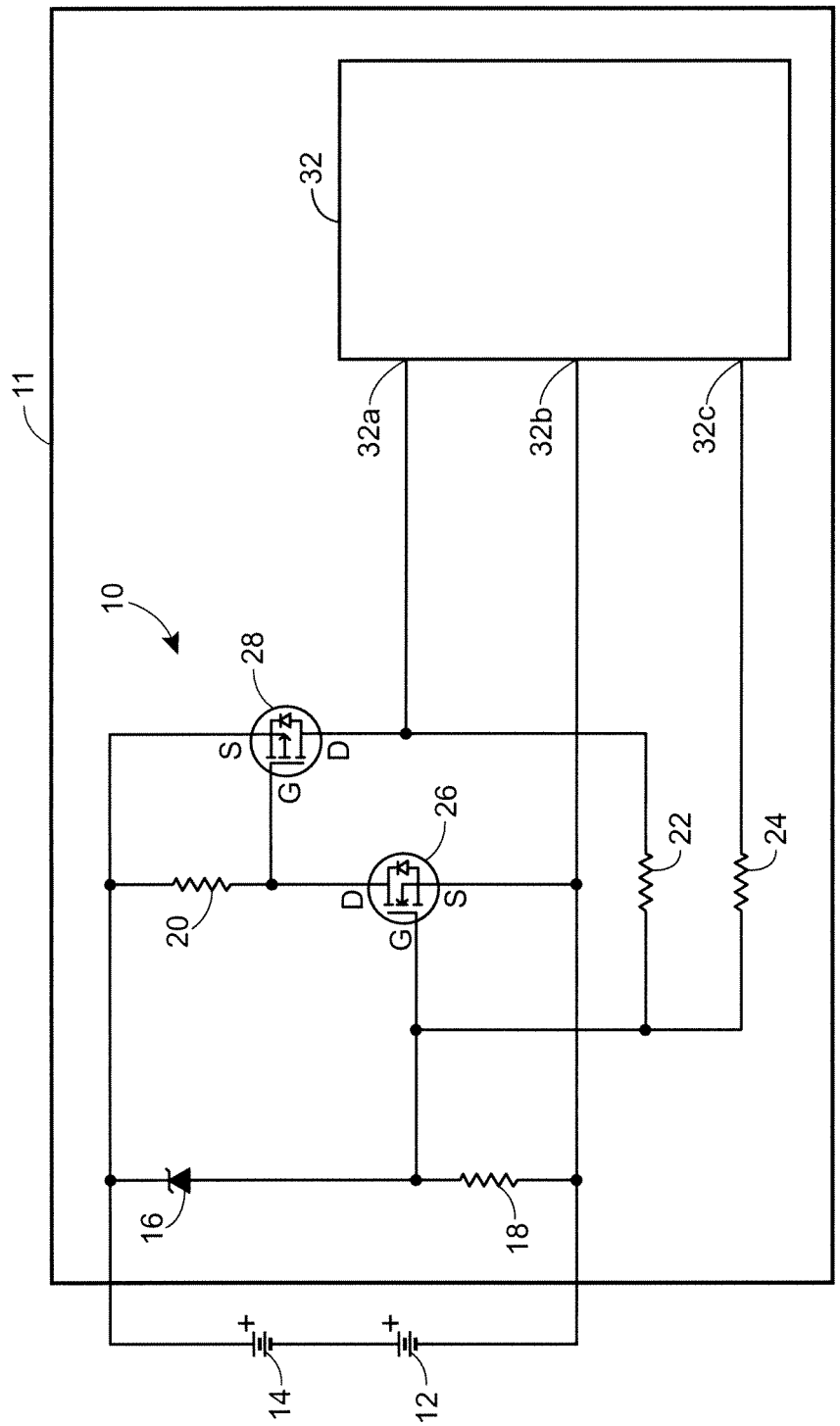

SYSTEM FOR PREVENTING DEEP BATTERY DISCHARGE

CROSS-REFERENCE TO RELATED APPLICATION

This application claims the benefit of U.S. Provisional Application Ser. No. 61/185,809, filed on Jun. 10, 2009, the entirety of which is incorporated herein by reference.

FIELD OF THE INVENTION

The present invention relates to a system for preventing deep discharge of one or more battery cells of a battery pack.

BACKGROUND OF THE INVENTION

Battery packs, such as for providing electrical power to electrically powered devices, such as electrical vehicles, hybrid vehicles, wheelchairs, e-bikes, and electric scooters, are known. Battery packs typically include a plurality of individual battery cells electrically coupled in series and/or parallel so as to provide a desired output voltage and capacity. Often battery management systems are provided to monitor and control the operation of the battery pack. In general these battery management systems may themselves draw current from the battery pack, even when the vehicle is not drawing power from the battery pack. Over time this can result in the battery pack being drained to what is referred to as a "deep discharge" condition, which can limit the useful life of the battery pack.

BRIEF DESCRIPTION OF THE DRAWINGS

FIG. 1 is a schematic drawing of a system for preventing deep battery discharge, such as might be incorporated in a battery management system for a lithium ion battery pack, in accordance with the present invention.

DETAILED DESCRIPTION

While this invention is susceptible of embodiment in many different forms, there will be described herein in detail, a specific embodiment thereof with the understanding that the present disclosure is to be considered as an exemplification of the principles of the invention and is not intended to limit the invention to the specific embodiment illustrated.

A system for preventing deep battery discharge, or low voltage cut-off circuit, in accordance with the invention, and generally designated 10, is illustrated in FIG. 1. The low voltage cut-off circuit 10 is part of a battery management system 11. The low voltage cut-off circuit 10 is shown coupled to two lithium ion battery cells, 12, 14, which are coupled in series. Typically battery packs include many more battery cells, but for purposes of discussion, only the two battery cells 12, 14 will be discussed. The battery cells 12, 14 are preferably lithium iron phosphate battery cells, although they may be of other battery chemistries.

In accordance with the present description, the battery cells 12, 14 each have a nominal voltage of 3.6-3.7 volts when fully charged, but they typically operate at 3.2-3.3 volts. The battery cells 12, 14 provide electrical power to an electrically powered device (not shown).

As is known, the battery management system 11 performs various conventional functions. One such function is to monitor the voltage across the battery cells, either individually or collectively. When the battery management system 11 determines that the voltage of the monitored battery cells has dropped below a desirable operating threshold, such as 2.3 volts per battery cell, the battery management system 11 typically turns off battery power to the device. It may be desirable that the battery management system 11 continue to operate, even if power to the device has been turned off, such as to provide an indication that the device was shut down due to a low battery condition. However as noted above, even when the device is turned off, the battery management system 11 itself continues to draw current. The low-voltage cut-off circuit 11 is provided to turn off power to the battery management system 11 when the voltage across the battery cells drops below a cut-off threshold, such as approximately 2.1 volts per cell. This can be accomplished on a battery cell by battery cell basis, or collectively across a series of battery cells.

The low voltage cut-off circuit 10 includes a Zener diode 16, first through fourth resistors 18, typically having a high impedance in the range of 100 kΩ to 10 MΩ, a complementary transistor switch comprising first and second complementary transistors 26, 28, respectively, and a microprocessor 32 having memory and microprocessor logic stored thereon. The first transistor 26 may be an N-channel MOSFET, and the second transistor 28 may be a complementary P-channel MOSFET. Alternatively the first transistor 26 may be an npn transistor, and the second transistor 28 may be a complementary pnp transistor, or such other combinations of complementary transistor devices. The microprocessor may be a Microchip PIC16F690, a Microchip PIC12F675, a Microchip PIC16F684, a Microchip PIC16F616, or an Atmel ATtiny13A series, or such other conventional microprocessor.

In accordance with the invention, the low voltage cut-off circuit 10 obtains zero current draw from the battery cells 12, 14, when the low voltage cut-off circuit 10 is off.

When the battery voltage drops below a useable voltage level, typically about 2.1 volts (±0.1 v) per cell for the present battery chemistry, the low voltage cut-off circuit 10 is off, preventing flow of current from the battery cells 12, 14.

In accordance with the invention, the low voltage cut-off circuit 10 automatically reactivates when the battery pack voltage rises to a useable value.

Referring to FIG. 1, the low voltage cut-off circuit 10 is off until the battery voltage collectively across first and second battery cells 12, 14 rises above the threshold voltage of the Zener diode 16. The threshold voltage of a Zener diode (i.e., the voltage at which a Zener diode begins to conduct) is typically slightly lower than its nominally rated Zener voltage. The rated voltage of the Zener diode 16 is selected depending upon the number of battery cells being measured. In the present disclosure with respect to two battery cells, the rated voltage of the Zener diode 16 is 4.7 v, but could also be 5.1 v or 5.7 v, depending upon the desired circuit operation, i.e., when one wants the circuit to turn on.

Once the voltage across the first and second battery cells 12, 14 reaches the threshold voltage of the Zener diode 16, a "first" threshold voltage, the Zener diode 16 begins to conduct, and the current flows through the first resistor 18. This raises the gate voltage on the first transistor 26, causing the first transistor 26 to conduct. When the first transistor 26 conducts, current flows through the second resistor 20. This causes the gate voltage of the second transistor 28 to fall (i.e., to increase in a negative direction), and current begins to flow through the second transistor 28. Thus the complementary switch is in an ON, or conducting, condition The third resistor 22 is a feedback resistor, which conducts some of the current flowing through the second transistor 28 to flow back through the first transistor 18. This helps to maintain the first transistor 26, and thus the second transistor 28, conducting, and provides some hysteresis in the turn-on voltage of the first transistor 26. In other words, the turn-on voltage (the "first" threshold voltage) is slightly higher than the turn-off voltage, a "second" threshold voltage, preventing oscillation due to voltage fluctuations of the battery cells 12, 14.

The microprocessor 32 includes a battery voltage sensing input 32a, a ground reference input 32b and a hold logic signal output 32c.

The fourth resistor 24 is coupled to hold logic signal output 32c, which is controlled by microcontroller logic resident in the memory of the microprocessor 32. When the second transistor 28 conducts, the battery sensing input 32a senses the voltage across the first and second battery cells 12, 14, permitting the microprocessor 32 to monitor the voltage across the first and second battery cells 12, 14. As long as the sensed battery voltage of the battery cells 12, 14 remains above a third threshold voltage, which set by the microprocessor 32 and which is less than the second threshold voltage, the hold logic signal from the hold logic output 32c is high. This supplies additional current back to the first transistor 26, keeping the low voltage cut-off circuit 10 active.

When the voltage level of the battery cells 12, 14, falls below the threshold voltage of the Zener diode 16, i.e., the first threshold voltage, the Zener diode 16 will stop conducting. However the current through the third resister 22 and the hold logic signal through the fourth resister 24 will cause the first and second transistors 26, 28 to continue conducting, and the microprocessor 32 will continue to monitor the voltage across the battery cells 12, 14. When the voltage across the first and second battery cells 12, 14 falls below the second threshold voltage, the current through the third resister will no longer be sufficient to cause the first and second transistors 26, 28 to continue conducting, but the hold logic signal will cause the first and second transistors 26, 28 to continue conducting, and the microprocessor 32 will continue to monitor the voltage across the battery cells 12, 14. However when the voltage across the first and second battery cells 12, 14 falls below the third threshold voltage, the hold output signal will go low, causing the first transistor 26, and thus the second transistor 28, to stop conducting. This causes the input to the voltage sensing input 32a of the microprocessor to go to zero. In response to the input to the voltage sensing input 32a of the microprocessor going to zero, the microprocessor 32 shuts itself down. This causes the hold logic signal to go low and the low voltage cut-off circuit 10 will shut off completely.

Because the value of the third threshold voltage is set by the microprocessor logic of the microprocessor 23, the value can be readily adjusted and the voltage at which the cut-off circuit 10 turns off can be tightly regulated.

Later when the battery cells 13, 14 are replaced, or recharged, and the voltage exceeds the first threshold voltage (i.e., the threshold voltage of the Zener diode 16), the Zener diode will begin again to conduct, the first transistor 26 will conduct, causing the second transistor 28 to conduct. The microprocessor 32 will then sense the battery voltage at the battery voltage sensing input 32a, causing the microprocessor 32 to turn on, and the process repeats itself.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claim all such modifications as fall within the scope of the claim.

The invention claimed is:

1. A battery management system for managing the voltage of a battery cell providing power to a load, the battery management system to prevent the battery cell from being drained to a deep discharge condition after the battery management system has turned off power from the battery cell to the load, the battery management system comprising:
   a semiconductor switch coupled parallel to the battery cell, wherein the semiconductor switch is in an on condition when the voltage across the battery cell exceeds a first threshold voltage and in an off condition when the voltage across the battery cell is below a second, lower, threshold value; and
   a microprocessor coupled to the semiconductor switch via a battery voltage sensing input;
   wherein the semiconductor switch comprises first and second complementary transistors and a Zener diode; and
   wherein the microprocessor monitors the voltage across the battery cell when the semiconductor switch is on, and turns itself off in response to the battery voltage sensing input falling to zero when the monitored voltage is less than the second threshold voltage, thereby preventing further current drain from the battery cell.

2. The battery management system of claim 1 wherein the second threshold voltage is determined by the microprocessor.

3. The battery management system of claim 1 wherein the microprocessor maintains the semiconductor switch in the on condition until the monitored voltage is less than the second threshold voltage.

4. A battery management system for managing the voltage of a battery cell providing power to a load, the battery management system to prevent the battery cell from being drained to a deep discharged condition after the battery management system has turned off power to the load, the battery management system comprising:
   a semiconductor switch comprising a Zener diode and a complementary transistor pair, the semiconductor switch being coupled in parallel with the battery cell, wherein the Zener diode begins conducting at a first threshold voltage and the semiconductor switch is in an on condition when the voltage across the battery cell exceeds the first threshold voltage; and
   a microprocessor coupled to the semiconductor switch via a battery voltage sensing input;
   wherein the microprocessor monitors the voltage across the battery cell when the semiconductor switch is on, and turns itself off in response to the battery voltage sensing input falling to zero when the monitored voltage is less than a second threshold voltage, thereby preventing further current drain from the battery cell.

5. The battery management system of claim 4 wherein the second threshold voltage is determined by the microprocessor.

6. The battery management system of claim 4 wherein the second threshold voltage is less than the first threshold voltage.

* * * * *